US012307218B2

(12) United States Patent
Tanabe

(10) Patent No.: US 12,307,218 B2
(45) Date of Patent: May 20, 2025

(54) INFORMATION PROCESSING APPARATUS, CONTROL METHODS THEREOF, AND RECORDING MEDIUM FOR NEURAL NETWORK LEARNING MODELS UTILIZING DATA MINIMIZATION

(71) Applicant: CANON KABUSHIKI KAISHA, Tokyo (JP)

(72) Inventor: Akihiro Tanabe, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 1075 days.

(21) Appl. No.: 17/188,234

(22) Filed: Mar. 1, 2021

(65) Prior Publication Data

US 2021/0279572 A1 Sep. 9, 2021

(30) Foreign Application Priority Data

Mar. 3, 2020 (JP) ................. 2020-036041

(51) Int. Cl.
*G06N 3/08* (2023.01)
*G06F 7/485* (2006.01)
(Continued)

(52) U.S. Cl.
CPC ............. *G06F 7/485* (2013.01); *G06F 7/50* (2013.01); *G06F 18/22* (2023.01); *G06N 3/08* (2013.01); *G06V 10/764* (2022.01); *G06V 10/82* (2022.01)

(58) Field of Classification Search
CPC ............ G06F 7/485; G06F 7/50; G06F 18/22; G06N 3/08; G06N 3/045; G06N 5/01;
(Continued)

(56) References Cited

U.S. PATENT DOCUMENTS 5,487,130 A * 1/1996 Ichimori ............... G06N 7/023
706/59
10,152,970 B1 * 12/2018 Olabiyi .................. G06N 20/00
(Continued)

FOREIGN PATENT DOCUMENTS

JP 2014-123814 A 7/2014

OTHER PUBLICATIONS

Gordienko et al., "Adaptive Iterative Pruning for Accelerating Deep Neural Networks", IEEE. (Year: 2019).*

(Continued)

*Primary Examiner* — Randall K. Baldwin
(74) *Attorney, Agent, or Firm* — Cowan, Liebowitz & Latman, P.C.

(57) ABSTRACT

An information processing apparatus comprises an input unit that inputs input data, a first determining unit that determines a predetermined value to be converted to 0 from among a plurality of values contained in the input data input by the input unit, a processing unit that performs a processing operation of converting the values of the input data that match the predetermined value to 0, and a processing operation of subtracting the predetermined value from the values of the input data other than the values converted to 0; and a learning unit that, if a proportion of 0 values contained in processed data obtained as a result of the processing operations performed by the processing unit is less than a first threshold value, performs learning processing to generate a learned model using the processed data.

9 Claims, 8 Drawing Sheets

(51) Int. Cl.
*G06F 7/50* (2006.01)
*G06F 18/22* (2023.01)
*G06V 10/764* (2022.01)
*G06V 10/82* (2022.01)

(58) Field of Classification Search
CPC ...... G06N 20/10; G06N 3/063; G06V 10/764;
G06V 10/82
See application file for complete search history.

(56) References Cited

U.S. PATENT DOCUMENTS

| | | | |
|---|---|---|---|
| 2018/0082181 A1* | 3/2018 | Brothers | G06N 3/045 |
| 2019/0095757 A1* | 3/2019 | Sugiura | G06F 21/60 |
| 2019/0347847 A1* | 11/2019 | Elgharib | G06T 15/205 |
| 2019/0392287 A1* | 12/2019 | Ovsiannikov | G06F 17/153 |
| 2021/0279589 A1* | 9/2021 | Lee | G06F 17/16 |

OTHER PUBLICATIONS

Riera et al., "(Pen-) Ultimate DNN Pruning". (Year: 2019).*
Zhu et al., "To prune, or not to prune: exploring the efficacy of pruning for model compression" (Year: 2017).*
Simonyan et al, "Very Deep Convolutional Networks for Large-Scale Image Recognition". (Year: 2015).*

* cited by examiner

FIG. 3A

| 134 | 124 | 223 | 231 | 65 |
|---|---|---|---|---|
| 134 | 124 | 45 | 41 | 43 |
| 157 | 124 | 43 | 43 | 43 |
| 157 | 48 | 43 | 43 | 0 |
| 75 | 0 | 0 | 54 | 78 |

FIG. 3B

| 91 | 81 | 180 | 188 | 22 |
|---|---|---|---|---|
| 91 | 81 | 2 | 0 | 0 |
| 114 | 81 | 0 | 0 | 0 |
| 114 | 5 | 0 | 0 | 0 |
| 32 | 0 | 0 | 11 | 35 |

FIG. 6A

|     |     | 601 |     |     |
|-----|-----|-----|-----|-----|
| 91  | 81  | 180 | 188 | 22  |
| 91  | 81  | 2   | 0   | 0   |
| 114 | 81  | 0   | 0   | 0   |
| 114 | 5   | 0   | 0   | 0   |
| 32  | 0   | 0   | 11  | 35  |

|     |     | 611 |     |     |
|-----|-----|-----|-----|-----|
| 91  | 81  | 180 | 188 | 22  |
| 91  | 81  | 0   | 0   | 0   |
| 114 | 81  | 0   | 0   | 0   |
| 114 | 0   | 0   | 0   | 0   |
| 32  | 0   | 0   | 0   | 35  |

612, 613

INFORMATION PROCESSING APPARATUS, CONTROL METHODS THEREOF, AND RECORDING MEDIUM FOR NEURAL NETWORK LEARNING MODELS UTILIZING DATA MINIMIZATION

BACKGROUND OF THE INVENTION

Field of the Invention

The present invention relates to a data processing technique for use in machine learning.

Description of the Related Art

Machine learning as typified by neural networks can be used not only on clouds, but also in application-specific devices. For example, an image capturing apparatus that determines a specific subject using a neural network and automatically focuses on the subject is commercially available as a product.

The data size of a neural network is an issue to overcome when performing neural network processing in an application-specific device. There are a large number of parameters of a learned model depending on the type of neural network, which increases data size. As a method for reducing data size, processing called pruning is known in which the number of nodes in a neural network is reduced, or the number of connections between nodes in a neural network is reduced.

For the data size of a portion other than the parameters of a learned model, for example, Japanese Patent Laid-Open No. 2014-123814 discloses a method in which RAW data that is input data is read to generate RGB data, and pixels other than those correspond to the color components are masked to set the values of the pixels to 0, and thereafter a convolution operation is performed.

However, according to Japanese Patent Laid-Open No. 2014-123814, the values of the input data that are converted to 0 are determined not based on the state of the input data, and no consideration is given to the influence on accuracy.

SUMMARY OF THE INVENTION

The present invention has been made in consideration of the problems described above, and realizes a technique for reducing the data size of input data while reducing the influence on accuracy in machine learning.

According to a first aspect of the present invention, there is provided an information processing apparatus comprising: at least one processor or circuit configured to function as: an input unit that inputs input data; a first determining unit that determines a predetermined value to be converted to 0 from among a plurality of values contained in the input data input by the input unit; a processing unit that performs a processing operation of converting the values of the input data that match the predetermined value to 0, and a processing operation of subtracting the predetermined value from the values of the input data other than the values converted to 0; and a learning unit that, if a proportion of 0 values contained in processed data obtained as a result of the processing operations performed by the processing unit is less than a first threshold value, performs learning processing to generate a learned model using the processed data.

According to a second aspect of the present invention, there is provided an inference apparatus including an inference circuit that performs inference processing using learned models learned by an information processing apparatus and processed data, the information processing apparatus comprising: at least one processor or circuit configured to function as: an input unit that inputs input data; a first determining unit that determines a predetermined value to be converted to 0 from among a plurality of values contained in the input data input by the input unit; a processing unit that performs a processing operation of converting the values of the input data that match the predetermined value to 0, and a processing operation of subtracting the predetermined value from the values of the input data other than the values converted to 0; and a learning unit that, if a proportion of 0 values contained in processed data obtained as a result of the processing operations performed by the processing unit is less than a first threshold value, performs learning processing to generate a learned model using the processed data.

According to a third aspect of the present invention, there is provided a method of controlling an information processing apparatus, comprising: inputting input data; performing a first determination of determining a predetermined value to be converted to 0 from among a plurality of values contained in the input data input in the input; performing a processing operation of converting the values of the input data that match the predetermined value to 0, and a processing operation of subtracting the predetermined value from the values of the input data other than the values converted to 0; and if a proportion of 0 values contained in processed data obtained as a result of processing performed in the processing operations is less than a first threshold value, performing learning processing to generate a learned model using the processed data.

According to a fourth aspect of the present invention, there is provided an inference method for performing inference processing using learned models learned by an information processing apparatus and processed data, the information processing apparatus comprising: at least one processor or circuit configured to function as: an input unit that inputs input data; a first determining unit that determines a predetermined value to be converted to 0 from among a plurality of values contained in the input data input by the input unit; a processing unit that performs a processing operation of converting the values of the input data that match the predetermined value to 0, and a processing operation of subtracting the predetermined value from the values of the input data other than the values converted to 0; and a learning unit that, if a proportion of 0 values contained in processed data obtained as a result of the processing operations performed by the processing unit is less than a first threshold value, performs learning processing to generate a learned model using the processed data.

Further features of the present invention will become apparent from the following description of exemplary embodiments with reference to the attached drawings.

BRIEF DESCRIPTION OF THE DRAWINGS

FIGS. 3A and 3B are diagrams illustrating processing operations of converting input data according to the first embodiment.

FIGS. 6A and 6B are diagrams illustrating processing operations of converting input data according to a second embodiment.

DESCRIPTION OF THE EMBODIMENTS

Figure 1:
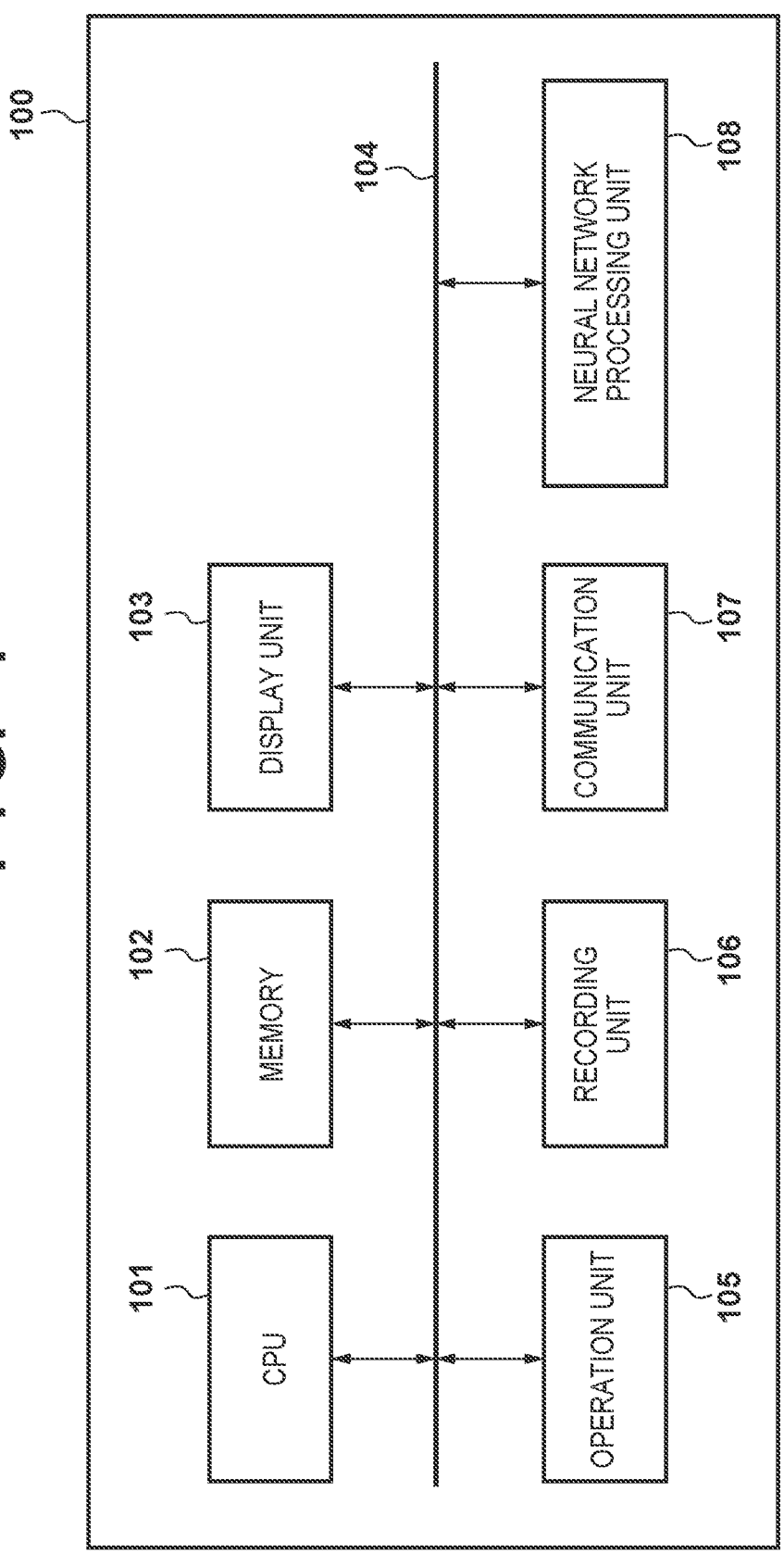
FIG. 1 is a block diagram showing a hardware configuration of an information processing apparatus according to a first embodiment.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

First Embodiment

Hereinafter, learning processing and inference processing according to a first embodiment of the present invention will be described. FIG. 1 is a block diagram showing a hardware configuration of an information processing apparatus 100 that functions as a learning apparatus according to the first embodiment.

As shown in FIG. 1, the information processing apparatus 100 includes a CPU 101, a memory 102, a display unit 103, an operation unit 105, a recording unit 106, a communication unit 107, and a neural network processing unit 108.

The CPU 101 performs control on all of the processing blocks that constitute the information processing apparatus 100 by executing a computer program stored in the recording unit 106. The memory 102 is a memory used mainly as a work area for the CPU 101 and a buffer area for temporarily storing data.

The display unit 103 may be a liquid crystal panel, an organic EL panel, or the like, and displays an operation screen and the like based on an instruction from the CPU 101. An internal bus 104 is a bus for connecting the processing blocks of the information processing apparatus 100 to each other.

The operation unit 105 may be a keyboard, a mouse, a button, a touch panel, a remote controller, or the like, and receives an operation instruction from the user. Operation information input through the operation unit 105 is transmitted to the CPU 101, and the CPU 101 performs control on the processing blocks based on the operation information.

The recording unit 106 is a processing unit that includes a recording medium, and stores and reads various types of data with respect to the recording medium based on an instruction from the CPU 101. The recording medium may be, for example, an EEPROM, an embedded flash memory, an embedded hard disk, a removable memory card, or the like. In the recording unit 106, training data and input data that is learning data used by the neural network processing unit 108 are stored. In the case of newly creating training data, although a long processing time is required, a result of learning performed using a high-performance learned model with which high accuracy determination can be made is generated as the training data and recorded in the recording unit 106.

The communication unit 107 includes hardware and the like for performing wireless LAN communication and wired LAN communication. In the case of wireless LAN communication, the communication unit 107 is a block that performs processing based on, for example, IEEE 802.11n/a/g/b. The communication unit 107 connects to an external access point via a wireless LAN, and performs wireless LAN communication with another wireless communication device via the access point. Also, the communication unit 107 performs wired LAN communication via an external router or a switching hub using an Ethernet cable. The communication unit 107 performs communication with external devices including an image capturing apparatus 200, and exchanges information such as images, control data, learning data, and learned models.

The neural network processing unit 108 performs neural network learning processing using the learning data stored in the recording unit 106 and pre-created neural network models. The neural network processing unit 108 performs learning processing for constructing learned models that correspond to, for example, subjects of different classes using image data as input data. Also, the input data may be obtained from an instruction from the user via the operation unit 105, or may be received from the communication unit 107 that has been programmed in advance, or the input data recorded in the recording unit 106 may be read. The neural network processing unit 108 includes a GPU (Graphic Processing Unit) and a DSP (Digital Signal Processor). The neural network learning processing may be performed by the CPU 101 without providing the neural network processing unit 108, or may be performed by both of the CPU 101 and the neural network processing unit 108. Learned models that are results of learning processing performed by the neural network processing unit 108 are also stored in the recording unit 106 (learned model storage means). Also, the neural network processing unit 108 can also perform inference processing using the learned models stored in the recording unit 106 and input data for inference.

Figure 2:
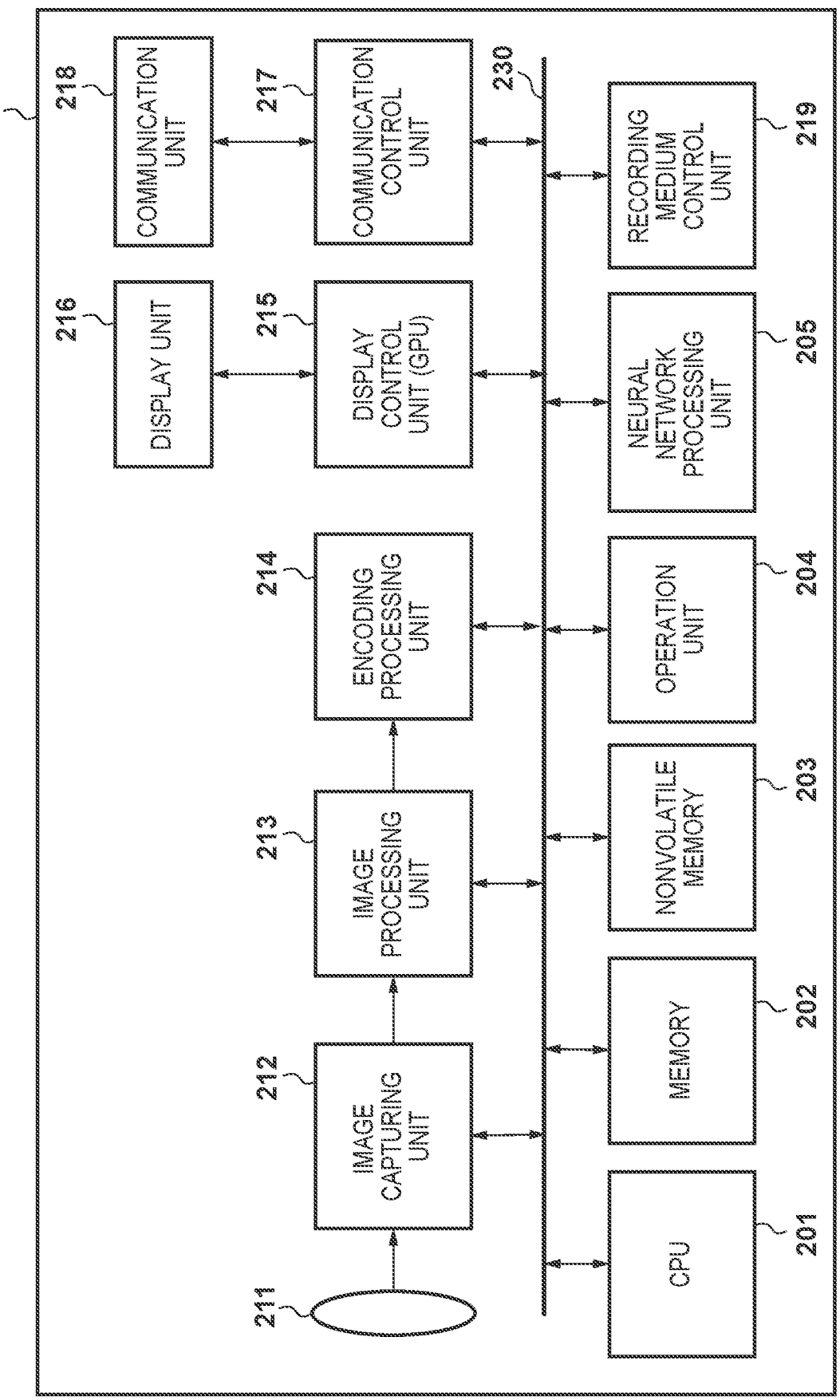
FIG. 2 is a block diagram showing a hardware configuration of an image capturing apparatus according to the first embodiment.

FIG. 2 is a block diagram showing a hardware configuration of an image capturing apparatus 200 that functions as an inference apparatus.

As shown in FIG. 2, the image capturing apparatus 200 includes a CPU 201, a memory 202, a nonvolatile memory 203, an operation unit 204, a neural network processing unit 205, an image capturing unit 212, an image processing unit 213, and an encoding processing unit 214. The image capturing apparatus 200 further includes a display control unit 215, a display unit 216, a communication control unit 217, a communication unit 218, a recording medium control unit 219, and an internal bus 230. Also, the image capturing apparatus 200 forms an optical image of a subject on a pixel array of the image capturing unit 212 using an image capturing lens 211. The image capturing lens 211 may be non-detachable from a body (casing, main body) of the image capturing apparatus 200, or may be detachable therefrom. Also, the image capturing apparatus 200 writes and reads image data with respect to a recording medium (not shown) via the recording medium control unit 219. The recording medium may be detachable from the image capturing apparatus 200, or may be non-detachable.

The CPU 201 controls the operations of the units (functional blocks) included in the image capturing apparatus 200 via the internal bus 230 by executing a computer program stored in the nonvolatile memory 203.

The memory 202 is a rewritable volatile memory. The memory 202 temporarily records a computer program for controlling the operations of the units of the image capturing apparatus 200, information such as parameters used for the operations of the units of the image capturing apparatus 200, information received by the communication control unit 217, and the like. The memory 202 also temporarily records images acquired by the image capturing unit 212, and images and information processed by the image processing unit 213, the encoding processing unit 214, and the like. The memory 202 has a storage capacity sufficient for temporarily recording the images, information, and the like.

The nonvolatile memory 203 is an electrically erasable and recordable memory, and, for example, an EEPROM, a hard disk or the like is used. The nonvolatile memory 203 stores a computer program for controlling the operations of the units of the image capturing apparatus 200 and information such as parameters used for the operations of the units of the image capturing apparatus 200. Through processing based on the computer program, various types of operations of the image capturing apparatus 200 are implemented. Furthermore, the nonvolatile memory 203 stores a computer program that is used by the neural network processing unit 205 and in which the processing operations of the neural network are described, and learned coefficient parameters such as weight coefficient and bias value. As used herein, the weight coefficient refers to a value that indicates the strength of connection between nodes in the neural network, and the bias value refers to a value that provides an offset to an integrated value of the weight coefficient with the input data. The nonvolatile memory 203 can store a plurality of learned coefficient parameters and a plurality of computer programs in which the processing operations of the neural network are described.

The plurality of learned coefficient parameters and the plurality of computer programs that are used by the neural network processing unit 205 and in which the processing operations of the neural network are described may be stored in the nonvolatile memory 203 instead of the memory 202. The nonvolatile memory 203 also stores history data.

The operation unit 204 provides a user interface for operating the image capturing apparatus 200. The operation unit 204 includes various types of buttons such as a power button, a menu button, a release button for image capturing, a moving image recording button, and a cancel button. The various types of buttons may be switches, buttons on a touch panel, or the like. The CPU 201 controls the image capturing apparatus 200 in accordance with an instruction from the user input via the operation unit 204. Here, an example is described in which the CPU 201 controls the image capturing apparatus 200 based on an operation input via the operation unit 204, but the present invention is not limited thereto. For example, the CPU 201 may control the image capturing apparatus 200 based on a request input from a remote controller (not shown), a portable terminal (not shown), or the like via the communication unit 218.

The neural network processing unit 205 performs neural network processing using coefficient parameters in pre-created learned models. As used herein, the neural network processing may be constructed by, for example, a CNN (Convolutional Neural Network), fully-connected layers, and the like, but the present invention is not limited thereto. Also, in the fully-connected layers, the learned coefficient parameters described above correspond to a weight coefficient and a bias value of each edge connecting nodes of different layers, and in the CNN, the learned coefficient parameters described above correspond to a weight coefficient and a bias value of the kernel. Also, the neural network processing unit 205 may have a function of decoding compressed input data and learned coefficient parameters.

The image capturing lens (lens unit) 211 includes: a lens group (not shown) including a zoom lens, a focus lens, and the like; a lens control unit (not shown); a diaphragm (not shown); and the like. The image capturing lens 211 may function as a zoom means that changes the angle of view. The lens control unit of the image capturing lens 211 adjusts the focal point and controls the aperture value (F number) based on a control signal transmitted from the CPU 201.

The image capturing unit 212 may function as an acquiring means that sequentially acquires a plurality of images that constitute a moving image. As the image capturing unit 212, for example, an area image sensor including a CCD (charge coupled device), a CMOS (complementary metal oxide semiconductor) device, or the like may be used. The image capturing unit 212 includes a pixel array (not shown) in which photoelectric conversion units (not shown) that convert an optical image of a subject into electric signals are arranged in rows and columns, or in other words, two dimensionally arranged. An optical image of a subject is formed on the pixel array by the image capturing lens 211. The image capturing unit 212 outputs captured images to the image processing unit 213 or the memory 202. The image capturing unit 212 can also acquire still images.

The image processing unit 213 performs predetermined image processing on the image data output from the image capturing unit 212 or the image data read out from the memory 202. Examples of the image processing include dynamic range conversion processing, interpolation processing, reduction processing (resizing processing), color conversion processing, and the like. Also, the image processing unit 213 performs predetermined computation processing for exposure control, focus adjustment control, and the like using image data acquired by the image capturing unit 212. The exposure control, the focus adjustment control, and the like are performed by the CPU 201 based on the result of computation obtained through the computation processing performed by the image processing unit 213. Also, the image processing unit 213 may perform data processing of converting a portion of the input data that is used by the neural network processing unit 205 to 0 values.

The encoding processing unit 214 performs, on the image data, intra-frame predictive encoding (intra-screen predictive encoding), inter-frame predictive encoding (inter-screen predictive encoding), and the like so as to compress the size of the image data. The encoding processing unit 214 may include, for example, a semiconductor element, and the like. The encoding processing unit 214 may be provided external to the image capturing apparatus 200. Also, the encoding processing unit 214 can encode the input data that is used by the neural network processing unit 205.

The display control unit 215 controls the display unit 216. The display unit 216 includes a display screen (not shown). The display control unit 215 generates an image that can be displayed on the display screen of the display unit 216, and outputs the generated image, or in other words, an image signal to the display unit 216. Also, the display control unit 215 can not only output the image data to the display unit 216, but also output the image data to an external device via the communication control unit 217. The display unit 216 displays an image on the display screen based on the image signal transmitted from the display control unit 215. The display unit 216 has an OSD (On Screen Display) function that is the function of displaying a setting screen such as a menu on the display screen. The display control unit 215 may superimpose an OSD image on the image signal, and output the image signal to the display unit 216. The display unit 216 includes a liquid crystal display, an organic EL display, or the like, and displays the image signal transmitted from the display control unit 215. The display unit 216 may be, for example, a touch panel. In the case where the display unit 216 is a touch panel, the display unit 216 can also function as the operation unit 204.

The communication control unit 217 is controlled by the CPU 201. The communication control unit 217 is configured to generate a modulation signal that conforms to wireless communication standards such as IEEE 802.11, output the generated modulation signal to the communication unit 218, and receive a modulation signal from an external device via the communication unit 218. Also, the communication control unit 217 can transmit and receive a control signal for controlling a video signal. For example, in order to transmit a video signal that conforms to communication standards such as HDMI® (High Definition Multimedia Interface) or SDI (Serial Digital Interface), the communication control unit 217 may control the communication unit 218.

The communication unit 218 converts the video signal and the control signal to physical electric signals, and transmits and receives the signals with respect to an external device. Here, an example has been described in which the video signal, the control signal, and the like are exchanged through wireless communication performed by the communication unit 218, but the communication performed by the communication unit 218 is not limited thereto.

The recording medium control unit 219 controls the recording medium. The recording medium control unit 219 outputs, based on a request from the CPU 201, a control signal for controlling the recording medium to the recording medium. As the recording medium, for example, a nonvolatile memory, a magnetic disk, or the like is used.

The functional blocks 201 to 205, 212 to 215, 217, and 219 can access with each other via the internal bus 230.

Input Data Converting Method

Figures 3A, 3B:
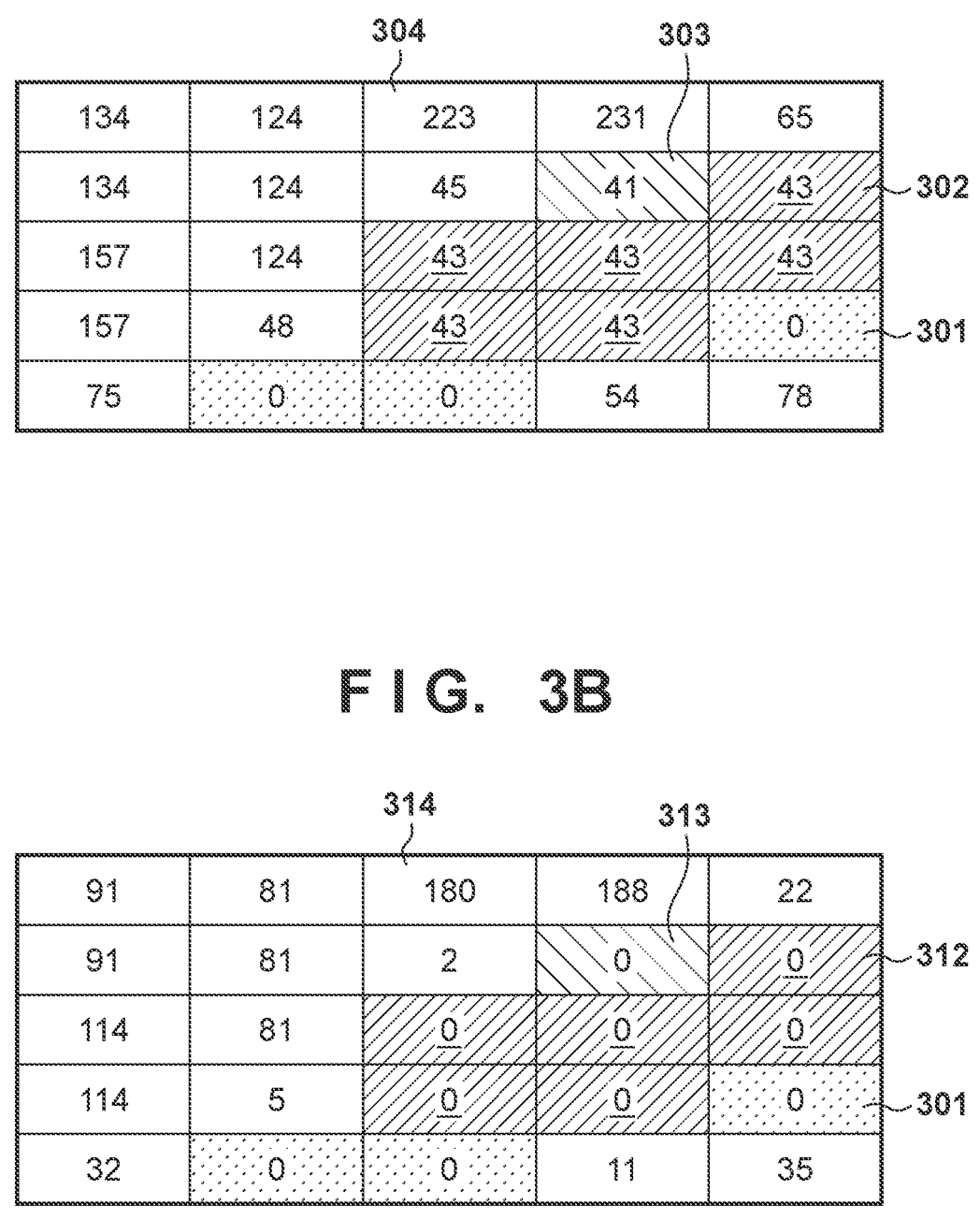

FIGS. 3A and 3B are diagrams illustrating input data converting processing.

FIG. 3A is a diagram showing a partial region of image data that is input data. Data 301 indicates a pixel with a value of 0 in the input data. Data 302 indicates a pixel that is to be converted to 0. Data 303 indicates a pixel with a value smaller than the pixel value of the data 302 that is to be converted to 0. Data 304 indicates a pixel with a value other than those of the data 301, the data 302, and the data 303. The image data may be only R of RGB or only a luminance signal of YUV, data including RGB, or image data including YUV. The pixels that are shaded or hatched in the same manner as the data 301, the data 302, the data 303, and the data 304 are the same data as the data 301, the data 302, the data 303, and the data 304, respectively, and the same applies hereinafter.

FIG. 3B is a diagram showing an example of the input data shown in FIG. 3A that has been processed. Data 301 indicates a pixel with a value of 0 in the input data that remains unchanged. Data 312 indicates a pixel with a value converted to 0. Data 313 indicates a pixel with a value converted to 0 because a value obtained by subtracting the value of the data 302 from the value of the data 303 is less than 0. For data other than the image data, values that are less than 0 as a result of subtraction such as the data 313 may be used unchanged. Data 314 indicates a pixel with a value converted to a value obtained by subtracting the value of the data 302 from the value of the data 304.

Flow of Processing of Information Processing Apparatus 100

Figure 4:
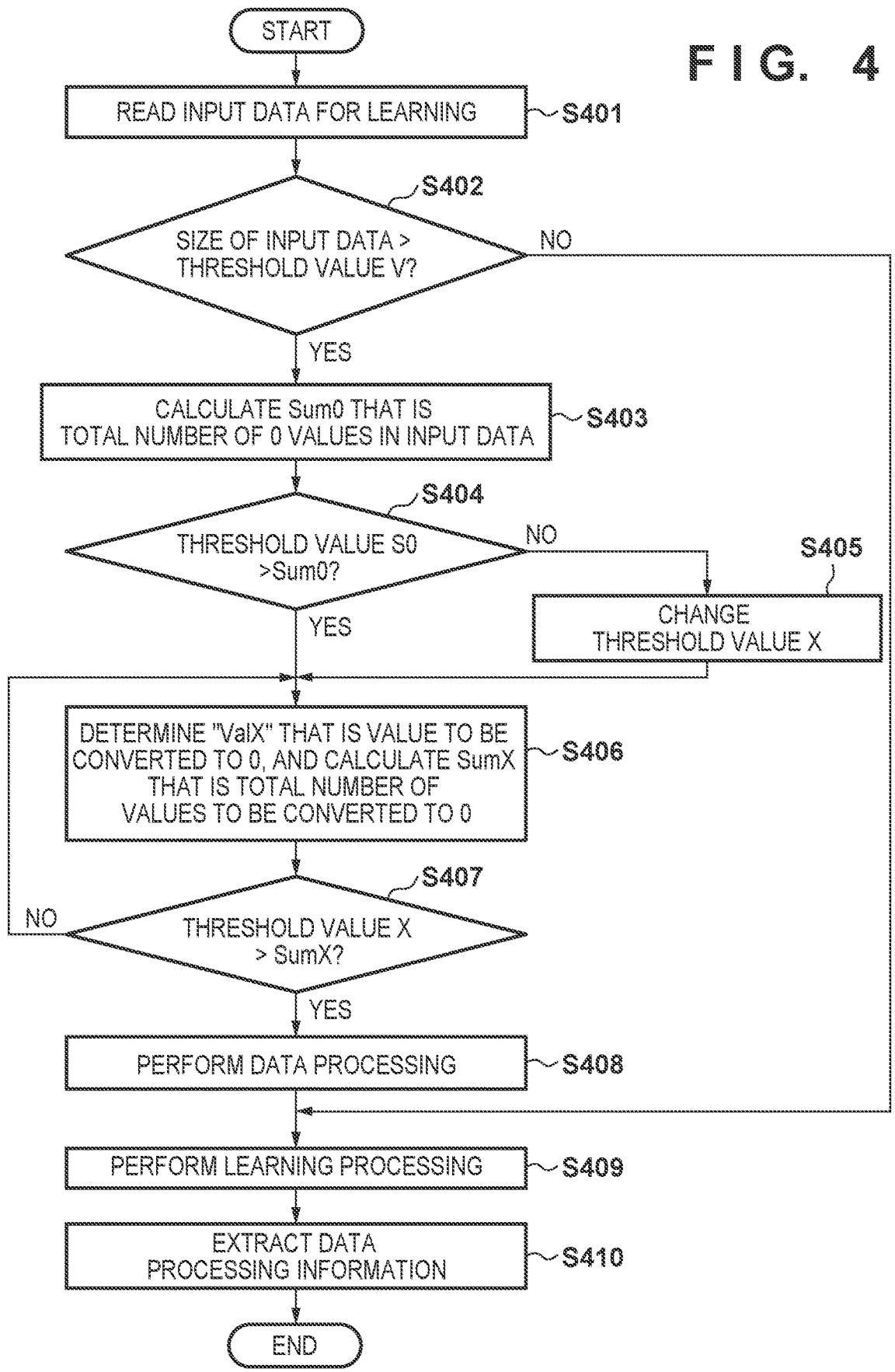
FIG. 4 is a flowchart of processing performed by the information processing apparatus according to the first embodiment.

FIG. 4 is a flowchart illustrating a flow of input data processing and learning processing performed by the information processing apparatus 100 according to the first embodiment.

This operation is implemented by, in a state in which the information processing apparatus 100 is powered on, a computer program stored in the recording unit 106 being loaded into the memory 102, and the CPU 101 reading the computer program from the memory 102 and executing the computer program.

In step S401, the CPU 101 loads the input data for learning recorded in the recording unit 106 into the memory 102. The CPU 101 advances the processing from step S401 to step S402.

In step S402, the CPU 101 determines whether or not the size of the input data loaded into the memory 102 is greater than a pre-set threshold value V. If the size of the input data is less than the threshold value V, the effect of conversion to 0 values is small, and it may negatively affect the accuracy. The determination described above is performed in order to avoid such a situation. If the size of the input data is greater than the threshold value V (YES in step S402), the CPU 101 advances the processing from step S402 to step S403. If the size of the input data is less than or equal to the threshold value V (less than or equal to the predetermined value) (NO in step S402), the CPU 101 advances the processing from step S402 to step S409.

In step S403, the CPU 101 checks the input data, calculates Sum0 that is the total number of 0 values in the input data, and stores the total number Sum0 in the memory 102. The CPU 101 advances the processing from step S403 to step S404.

In step S404, the CPU 101 compares the total number Sum0 that was calculated and stored in the memory 102 in step S403 with a pre-set threshold value S0. In this processing, if there are many 0 values in the input data, and the data is further subjected to conversion to 0 values, it may affect the accuracy, and thus the total number of 0 values in the input data is checked. If the total number Sum0 is less than the threshold value S0 (YES in step S404), the CPU 101 advances the processing from step S404 to step S406. If the total number Sum0 is greater than or equal to the threshold value S0 (NO in step S404), the CPU 101 advances the processing from step S404 to step S405.

In step S405, the CPU 101 changes the value of a threshold value X that is used in step S407, which will be described later. The CPU 101 sets the threshold value X according to the value of the total number Sum0 calculated in step S403. Specifically, if the total number Sum0 is large, the value of the threshold value X is reduced, and if the total number Sum0 is small, the value of the threshold value X is increased. The CPU 101 advances the processing from step S405 to step S406.

In step S406, the CPU 101 determines, from among the input data, ValX that is a value (predetermined value) to be converted to 0. As explained with reference to FIGS. 3A and 3B, the value of the predetermined value ValX may be determined from among a value that has the highest frequency in the input data, the average value of the entire input data, the median value of the entire input data, and the like. The CPU 101 counts the total number of ValX values (the total number of values that match the predetermined value ValX), and calculates a total number SumX. If the processing returns to step S406 as a result of determination made in step S407, which will be described later, the CPU 101 re-sets the value of the predetermined value ValX such that the value of the total number SumX decreases. The CPU 101 advances the processing from step S406 to step S407. Here, an example has been described in which the total number SumX is determined after the predetermined value ValX has been determined. However, a configuration is also possible in which the total number SumX is determined in advance, and the predetermined value ValX is set to be less than or equal to the total number SumX.

In step S407, the CPU 101 compares the total number SumX obtained in step S406 with the pre-set threshold value X. If the total number SumX is less than the threshold value X (YES in step S407), the CPU 101 advances the processing from step S407 to step S408. If the total number SumX is greater than or equal to the threshold value X (greater than or equal to the threshold value) (NO in step S407), the CPU 101 returns the processing from step S407 to step S406. If the number of times the processing returns from step S407 to step S406 exceeds a specific value, the CPU 101 may advance the processing to step S409, or present an error to the user via the display unit 103.

In step S408, the CPU 101 performs input data processing. As explained with reference to FIGS. 3A and 3B, the CPU 101 converts data that is included in the input data and has the same value as the value of the predetermined value ValX determined in step S406 to 0. For each data other than the data that has the same value as the value of the predetermined value ValX, the CPU 101 performs processing of subtracting the predetermined value ValX from the data. The CPU 101 stores the processed input data in the memory 102. If minus values cannot be expressed as in the case of the input data being image data, for each data with a value greater than the predetermined value ValX, the value is converted to 0, and for each data that originally has a value of 0, the value remains unchanged.

In step S409, the CPU 101 controls the neural network processing unit 108, and performs learning processing in the neural network on the processed data stored in the memory 102 in step S408 as input data for learning. In the case of supervised learning, the CPU 101 performs learning using the training data stored in the recording unit 106. In the case where the learning processing is performed using a learning method in which the training data uses the same data format as the input data, data processing may be performed on the training data through the processing steps described in steps S401 to S408 above.

In step S410, the CPU 101 stores data relating to handling of the value of the predetermined value ValX, data with a value less than or equal to the predetermined value ValX, and data that originally has a value of 0 that were obtained as a result of the data processing performed in step S408 in the recording unit 106 as a processed information file. Step S410 is effective when the predetermined value ValX is calculated by reading all of the input data to be learned in step S401. Accordingly, the processing in step S410 may be omitted. Through this processing, the CPU 101 ends the processing of the flowchart.

In the foregoing, an example of a flow of processing one data is described. However, actually, a plurality of data are processed. For example, in the case of images, a plurality of image data are processed instead of one image data. In the case where a plurality of image data are processed, the processing in steps S401 to S408 may be repeated to process the data, and then the learning processing in step S409 may be performed. Alternatively, the processing in steps S401 to step S408 and the processing in steps S409 to S410 may be performed in parallel as separate tasks. Also, in the case where a plurality of data are processed, the value of the predetermined value ValX may be determined from all of the plurality of input data.

Flow of Processing of Image Capturing Apparatus 200

Figure 5:
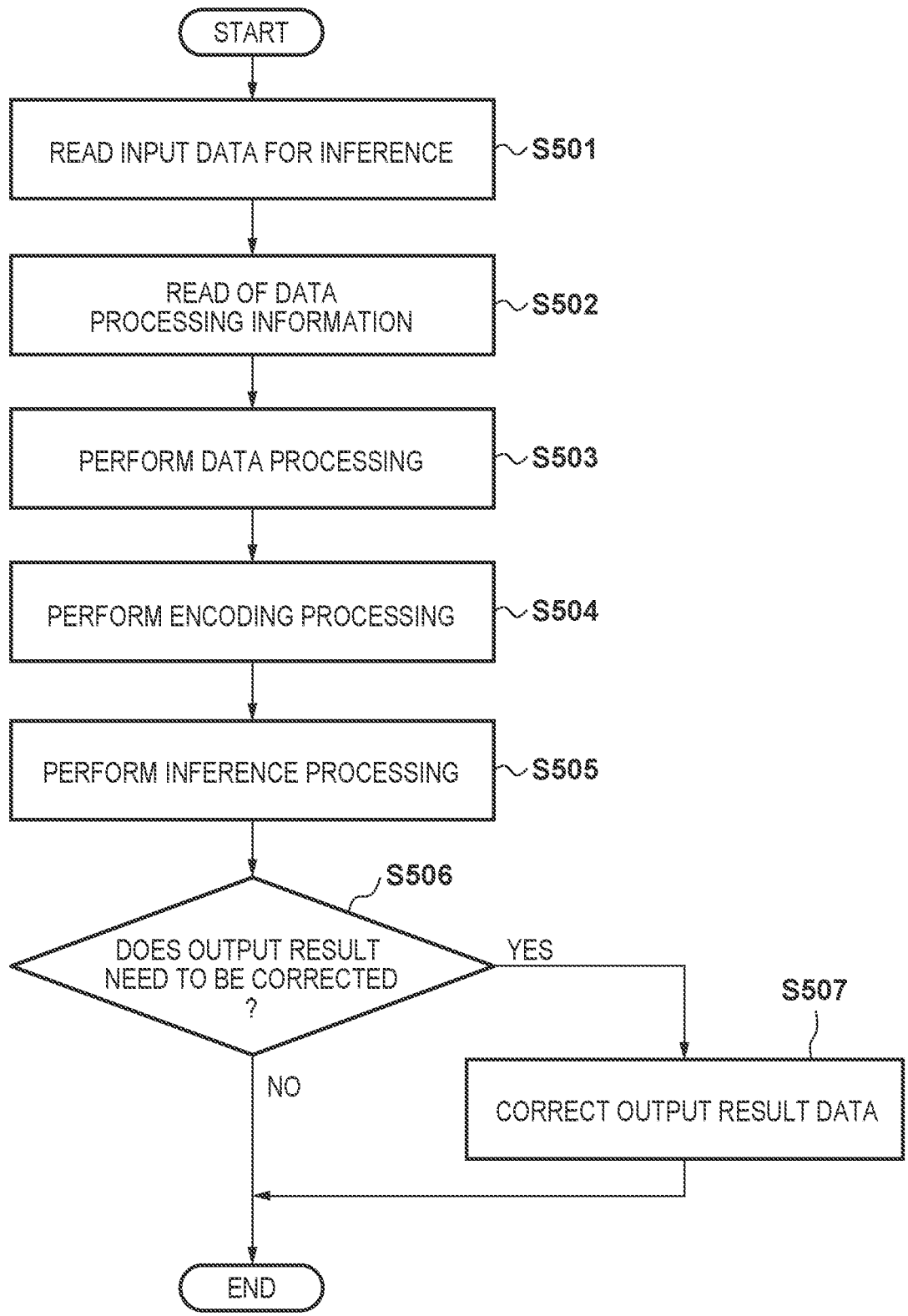
FIG. 5 is a flowchart of processing performed by the image capturing apparatus according to the first embodiment.

FIG. 5 is a flowchart illustrating a flow of inference processing performed by the image capturing apparatus 200 according to the first embodiment.

This operation is implemented by, in a state in which the image capturing apparatus 200 is powered on, a computer program stored in the nonvolatile memory 203 being loaded into the memory 202 and the CPU 201 reading the computer program from the memory 202 and executing the computer program. In the flowchart, an example will be described in which the image capturing apparatus 200 is used to perform inference processing, but the flowchart may be performed using the information processing apparatus 100 described above. Also, in FIG. 5, a case will be described in which image data captured by the image capturing apparatus 200 is input.

In step S501, the CPU 201 reads input data that is used to perform inference. The CPU 201 transmits image data captured by the image capturing unit 212 to the image processing unit 213. The CPU 201 advances the processing from step S501 to step S502.

In step S502, the CPU 201 acquires the processed information file of the information processing apparatus 100 stored in step S410 from the nonvolatile memory 203, and stores the processed information file in the memory 202. The CPU 201 acquires, from the processed information file stored in the memory 202, the above-described data relating to handling of the value of the predetermined value ValX, data with a value less than or equal to the predetermined value ValX, and data that originally has a value of 0. The processing in step S502 is effective when the processing in step S410 described above is performed during learning, and if there is no processed information file, it is determined that learning is not performed yet, and then the processing advances to step S503 without S502 being performed. The CPU 201 advances the processing from step S502 to step S503.

In step S503, in the case where the processing in step S502 was performed, the CPU 201 performs data processing on the image data that is the input data transmitted to the image processing unit 213 in accordance with the information contained in the processed information file acquired in step S502. In the case where the processing in step S502 was not performed, the CPU 201 performs data processing by executing the processing flow in steps S401 to S407 in the information processing apparatus 100 described above. The data processing is performed in the same manner as that of step S408 shown in FIG. 4. Also, the data processing may be executed by the CPU 201 or the image processing unit 213. The CPU 201 transmits the input data that has been subjected to data processing to the encoding processing unit 214. The CPU 201 advances the processing from step S503 to step S504.

In step S504, the CPU 201 performs encoding processing on the input data that has been subjected to data processing, using the encoding processing unit 214. In the encoding processing, encoding is performed in such a manner that the compression efficiency increases when there are many 0 values. The CPU 201 stores the encoded data in the memory 202, and advances the processing from step S504 to step S505.

In step S505, the CPU 201 performs inference processing by receiving the encoded data encoded in step S504 as input data, and controlling the neural network processing unit 205.

In the case where the input data is the encoded data encoded in step S504, the neural network processing unit 205 decodes the input data and performs inference processing. The CPU 201 stores the result of inference in the memory 202. The CPU 201 advances the processing from step S505 to step S506.

In step S506, the CPU 201 determines whether or not the result of inference stored in the memory 202 in step S505 needs to be corrected. For example, in the case where the result of inference is image data, and image recovery processing is performed, it is necessary to recover data by an amount corresponding to the subtraction processing performed on each data in step S503. If it is determined that the result of inference does not need to be corrected (NO in step S506), the CPU 201 ends the processing. If it is determined that the result of inference needs to be corrected (YES in step S506), the CPU 201 advances the processing from step S506 to step S507.

In step S507, the CPU 201 performs processing of recovering data by an amount corresponding to the subtraction processing performed on each data in step S503. Specifically, the predetermined value ValX is added to the data whose value was obtained by subtracting the predetermined value ValX in step S503. A value less than or equal to the predetermined value ValX is added to the data whose value was converted to 0 because it was smaller than the predetermined value ValX, and the data whose value was 0 is converted to 0. Then, the CPU 201 ends the processing.

As described above, through the processing according to the first embodiment, it is possible to convert a portion of the input data to 0 values while reducing the influence on accuracy, and thus the amount of data can be reduced. Furthermore, by converting a portion of the input data to 0 values, the compression efficiency can be enhanced, and thus the bus of the memory 102 can be efficiently used in the application-specific device.

Second Embodiment

Hereinafter, learning processing and inference processing according to a second embodiment will be described. In the first embodiment, a method was described in which the number of 0 values is increased by processing the input data. In the second embodiment, processing is performed to further increase the number of 0 values by further converting, in the input data, values close to 0 to 0. Furthermore, the input data processing is performed, taking not only the input data but also the proportion of 0 values in the learned coefficient parameters into consideration.

The block diagram showing a hardware configuration of an information processing apparatus 100 according to the second embodiment that serves as a learning apparatus is the same as that shown in FIG. 1, and the block diagram showing a hardware configuration of an image capturing apparatus 200 according to the second embodiment that serves as an inference apparatus is the same as that shown in FIG. 2.

Method of Converting Input Data

FIGS. 6A and 6B are diagrams illustrating input data converting processing.

FIG. 6A is a diagram showing an example in which input data that is the same as that shown in FIG. 3B has been processed. Data 601 indicates a value closest to 0, followed by the data 602, and the data 603 in this order. FIG. 6B is a diagram showing an example in which the data 601 to the data 603 have been converted to 0. As shown in FIG. 6B, the values of the data 601 to the data 603 have been converted to 0, which are indicated by the data 611, the data 612, the data 613, respectively.

Flow of Processing of Information Processing Apparatus 100

Figure 7A:
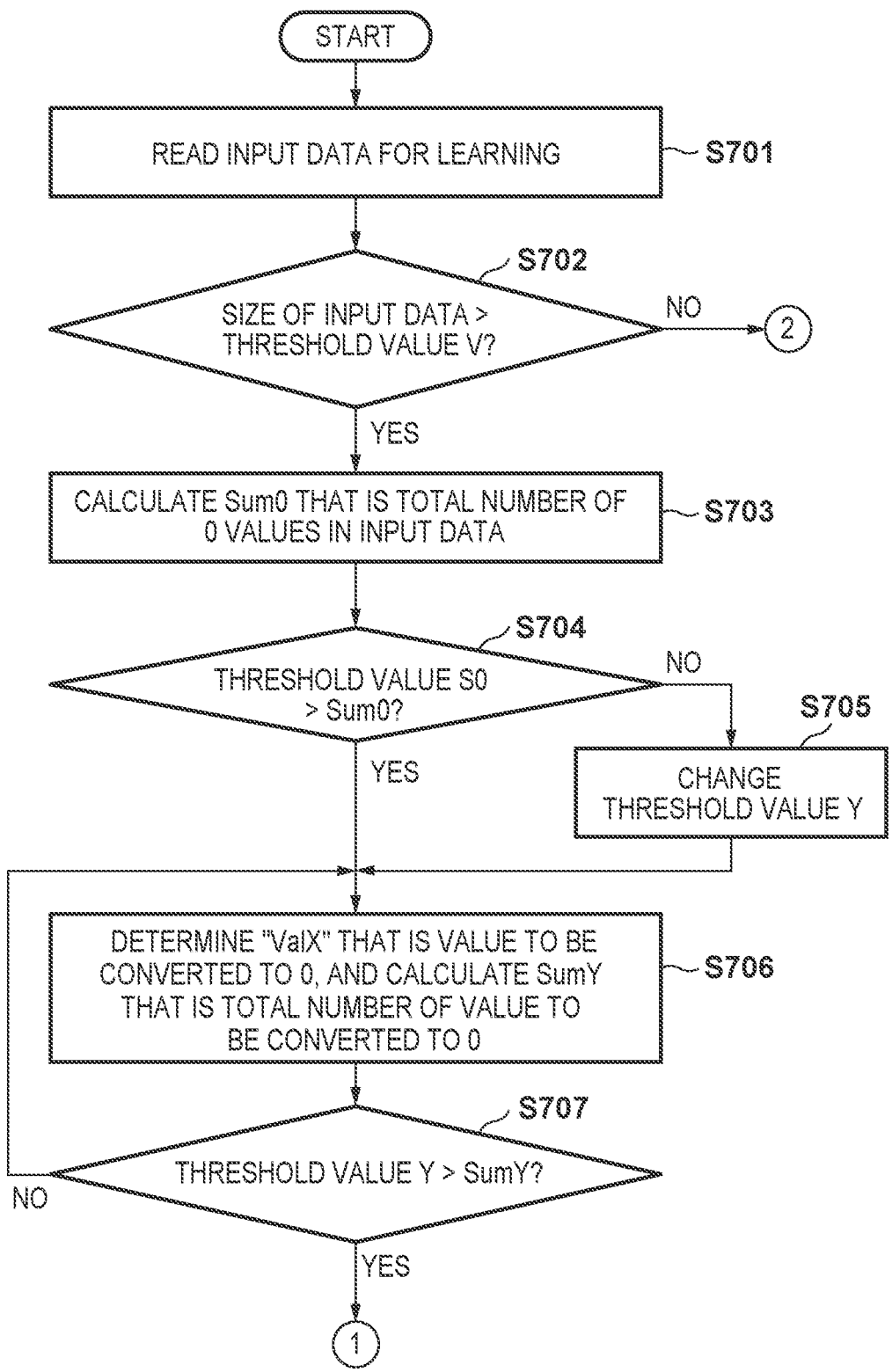
FIGS. 7A and 7B are flowcharts of processing performed by an information processing apparatus according to the second embodiment.
Figure 7B:
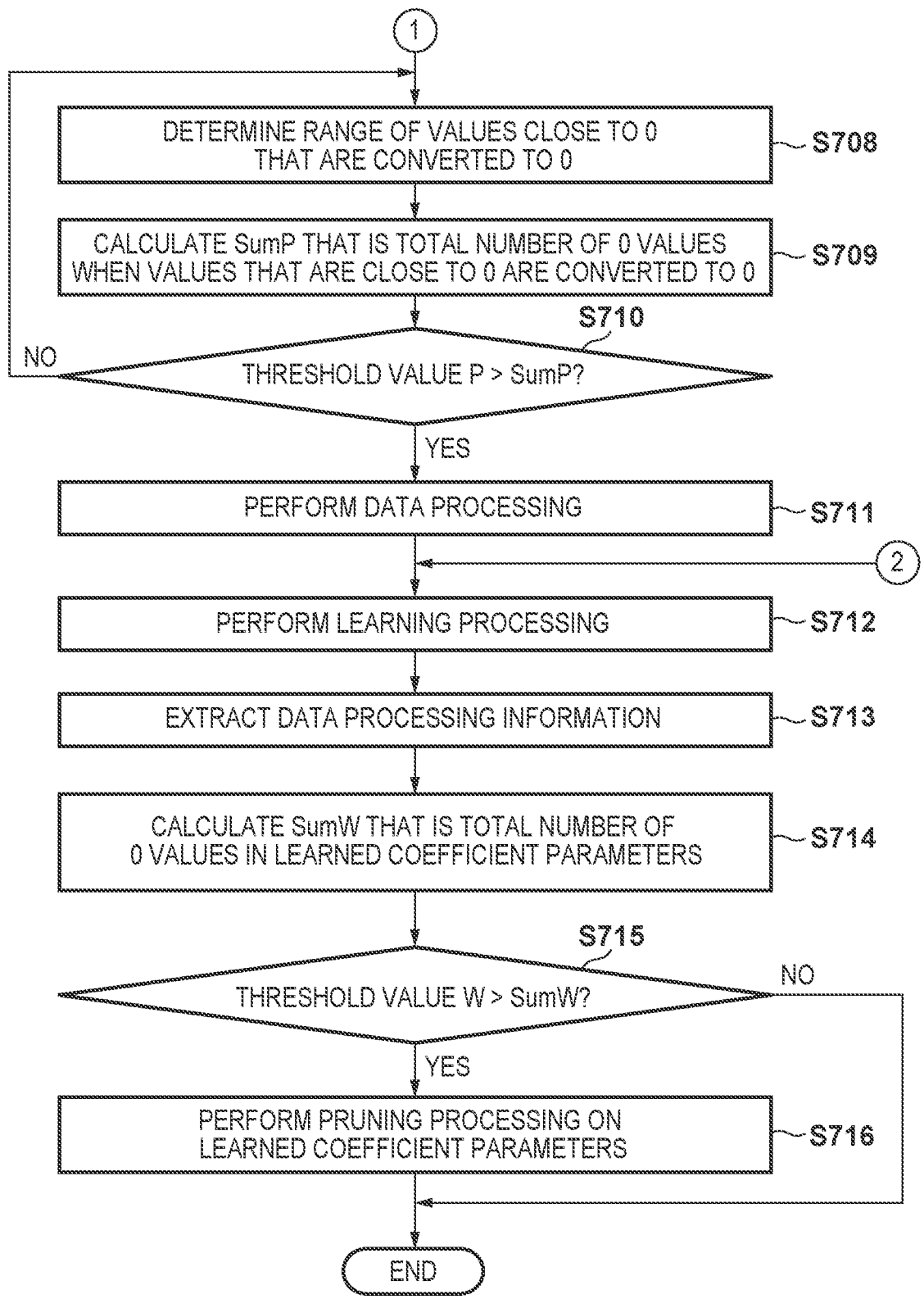

A flow of input data processing and learning processing performed by the information processing apparatus 100 according to the second embodiment will be described with reference to the flowcharts shown in FIGS. 7A and 7B.

This operation is implemented by, in a state in which the information processing apparatus 100 is powered on, a computer program stored in the recording unit 106 being loaded into the memory 102, and the CPU 101 reading the computer program from the memory 102 and executing the computer program.

The processing in steps S701 to S707 is the same as that performed in steps S401 to S407 of the first embodiment. However, a threshold value Y that is different from the threshold value X is set as the threshold value used in step S705 that is the same processing as in step S405 and step S707 that is the same processing as in step S407. The CPU 101 ends the processing of step S707, and advances the processing to step S708.

In step S708, the CPU 101 determines a range of values that are converted to 0 (a range of values that are less than or equal to a threshold value) in the processed data processed in step S706. For example, in the case of the processed data shown in FIGS. 6A and 6B, if the range (threshold value) is set to 1 to 2, only the value of the data 601 is converted to 0 value. If the range is set to 1 to 11, the data 601, the data 602, and the data 603 are converted to 0 values. The CPU 101 advances the processing from step S708 to step S709.

In step S709, the CPU 101 calculates, for all of the data processed in step S706, SumP that is the total number of data when the data in the range of values that are converted to 0 that was set in step S708 are converted, and stores the total number SumP in the memory 102. The CPU 101 advances the processing from step S709 to step S710.

In step S710, the CPU 101 compares the total number SumP with a threshold value P. If the total number SumP is less than the threshold value P (YES in step S710), the CPU 101 advances the processing from step S710 to step S711. If the total number SumP is greater than or equal to the threshold value P (NO in step S710), the CPU 101 returns the processing from step S710 to step S708. If the number of times the processing returns from step S710 to step S708 exceeds a specific value, the CPU 101 may advance the processing to step S711, or present an error to the user via the display unit 103.

In step S711, the CPU 101 performs, in addition to the same processing as in step S408, data processing on the data in the range of values that are converted to 0 that was set in step S708. The CPU 101 advances the processing from step S711 to step S712.

In step S712, the CPU 101 performs the same processing as in step S409, and advances the processing from step S712 to step S713.

In step S713, the CPU 101 generates, in addition to the same processing as in step S410, a data processing information file by adding information in the range of values that are close to 0 that was set in step S708, and advances the processing from step S713 to step S714. Like step S410, this step may be omitted.

In step S714, the CPU 101 calculates SumW that is the total number of 0 values in the learned coefficient parameters that are results of learning performed in step S712, and stores the calculated SumW in the memory 102. The CPU 101 advances the processing from step S714 to step S715.

In step S715, the CPU 101 compares the total number SumW calculated in step S714 with a pre-set threshold value W. If the total number SumW is less than the threshold value W (YES in step S715), the CPU 101 advances the processing from step S715 to step S716. If the total number SumW is greater than or equal to the threshold value W (NO in step S715), the CPU 101 ends the processing of the flowchart.

In step S716, the CPU 101 performs known pruning processing on the learned coefficient parameters. As the pruning processing, either the method in which the number of nodes is reduced, or the method in which the number of connections between nodes is reduced may be used. After that, the CPU 101 ends the processing of the flowchart.

Processing Flow of Image Capturing Apparatus 200

The processing flow of the image capturing apparatus 200 that performs inference processing is the same as the processing of the first embodiment shown in FIG. 5. However, in step S503, data processing including correction of the values close to 0 in the data processing information file acquired in step S502 is performed. Also, if there is no data processing information file, in step S503, data processing is performed by performing the processing in steps S701 to S710 in the processing flow of the information processing apparatus 100 according to the second embodiment.

As described above, through the processing according to the second embodiment, it is possible to further increase the number of 0 values as compared with that of the first embodiment while reducing the influence on accuracy, and thus the amount of data can be reduced. Also, pruning processing is performed on the learned coefficient parameters while taking into consideration the influence on accuracy accompanied by the input data processing, and thus the data of the learned coefficient parameters can also be reduced.

Variations

Up to here, the embodiments of the present invention have been described, but the present invention is not limited to the embodiments given above. Various modifications without departing from the spirit of the present invention are also encompassed in the scope of the present invention.

The applications of the present invention are not limited to the information processing apparatus 100, the image capturing apparatus 200, and the like described in the embodiments given above. For example, even if the information processing apparatus 100 is replaced by a system including a plurality of apparatuses, the same functions as those of the embodiments given above can be implemented. Furthermore, the present invention can be implemented by an external apparatus on the network performing a portion of the processing of the image capturing apparatus 200.

Also, it is sufficient that the neural network processing units 108 and 205 are processing units that operate based on an algorithm for machine learning, and the algorithm is not limited to a neural network. For example, an algorithm such as SVM (support vector machine) or a decision tree may be used.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-036041, filed Mar. 3, 2020, which is hereby incorporated by reference herein in its entirety.

What is claimed is:

1. An information processing apparatus comprising:
   one or more processors which execute computer instructions to perform the following:
   inputting input data comprising digital image data;
   determining if the input data has a size less than or equal to a predetermined threshold for the input data size;
   if the input size is determined to be greater than the predetermined threshold for the input size data,
      determining a predetermined value to be converted to 0 from among a plurality of values contained in the input data, wherein the predetermined value is a value that is calculated by the processor to have a highest frequency in the input data;
      performing a processing operation of converting the values of the input data that match the predetermined value to 0, a processing operation of subtracting the predetermined value from the values of the input data other than the values converted to 0, and storing the corresponding subtraction results in computer memory; and
   if a proportion of 0 values contained in processed data obtained as a result of the processing operations is less than a first threshold value, performing learning processing to generate a learned model using the processed input data that has undergone said conversion processing operation as input to the learned model;
   if the input size is determined to be less than the predetermined threshold for the input size data, performing learning processing to generate a learned model using the processed input data that has undergone said conversion processing operation as input to the learned model,
   wherein the learned model comprises learned coefficient parameters in at least one pre-created learned model, wherein in fully-connected layers of the pre-created learned model, the learned coefficient parameters correspond to a weight coefficient and a bias value of each edge connecting nodes of a plurality of different layers of the pre-created learned model, and in a convolutional neural network (CNN), the learned coefficient parameters correspond to a weight coefficient and a bias value of a kernel.

2. The information processing apparatus according to claim 1,
wherein, in the processing operation, values that are obtained as a result of the subtraction processing and are less than 0 are converted to 0.

3. The information processing apparatus according to claim 1,
wherein, in the processing operation, values that are obtained as a result of the subtraction processing and are greater than 0 and less than or equal to a second threshold value are converted to 0.

4. The information processing apparatus according to claim 3,
wherein, if the proportion of 0 values in the processed data is greater than or equal to a fourth threshold value, the second threshold value is changed.

5. The information processing apparatus according to claim 1,
wherein, if the proportion of 0 values in the processed data is greater than or equal to the first threshold value, the predetermined value is changed.

6. The information processing apparatus according to claim 1,
wherein the one or more processors do not perform the subtraction processing on 0 values in the input data.

7. The information processing apparatus according to claim 1,
wherein the one or more processors operating to:
determine whether or not the proportion of 0 values in the input data is less than or equal to a third threshold value, and
wherein if it is determined that the proportion of 0 values in the input data is greater than the third threshold value, the predetermined value is changed.

8. A method of controlling an information processing apparatus, comprising:
inputting input data comprising digital image data;
determining if the input data has a size less than or equal to a predetermined threshold for the input data size;
if the input size is determined to be greater than the predetermined threshold for the input size data,
performing a first determination of determining a predetermined value to be converted to 0 from among a plurality of values contained in the input data, wherein the predetermined value is a value that is calculated by the processor to have a highest frequency in the input data;
performing a processing operation of converting the values of the input data that match the predetermined value to 0, a processing operation of subtracting the predetermined value from the values of the input data other than the values converted to 0, and storing the corresponding subtraction results in computer memory; and
if a proportion of 0 values contained in processed data obtained as a result of the processing operations is less than a first threshold value, performing learning processing to generate a learned model using the processed input data that has undergone said conversion processing operation as input to the learned model;
if the input size is determined to be less than the predetermined threshold for the input size data, performing learning processing to generate a learned model using the processed input data that has not undergone said conversion processing operation as input to the learned model,
wherein the learned model comprises learned coefficient parameters in at least one pre-created learned model, wherein in fully-connected layers of the pre-created learned model, the learned coefficient parameters correspond to a weight coefficient and a bias value of each edge connecting nodes of a plurality of different layers of the pre-created learned model, and in a convolutional neural network (CNN), the learned coefficient parameters correspond to a weight coefficient and a bias value of a kernel.

9. A non-transitory computer readable recording medium in which a program for causing a computer to execute steps of a method of controlling an information processing apparatus is stored, the method comprising:
inputting input data that comprises digital image data;
determining if the input data has a size less than or equal to a predetermined threshold for the input data size;
if the input size is determined to be greater than the predetermined threshold for the input size data,
performing a first determination of determining a predetermined value to be converted to 0 from among a plurality of values contained in the input data, wherein the predetermined value is a value that is calculated by the processor to have a highest frequency in the input data;
performing a processing operation of converting the values of the input data that match the predetermined value to 0, a processing operation of subtracting the predetermined value from the values of the input data other than the values converted to 0, and storing the corresponding subtraction results in computer memory; and
if a proportion of 0 values contained in processed data obtained as a result of the processing operations is less than a first threshold value, performing learning processing to generate a learned model using the processed input data that has undergone said conversion processing operation as input to the learned model;
if the input size is determined to be less than the predetermined threshold for the input size data, performing learning processing to generate a learned model using the processed input data that has undergone said conversion processing operation as input to the learned model,
wherein the learned model comprises learned coefficient parameters in at least one pre-created learned model, wherein in fully-connected layers of the pre-created learned model, the learned coefficient parameters correspond to a weight coefficient and a bias value of each edge connecting nodes of a plurality of different layers of the pre-created learned model, and in a convolutional neural network (CNN), the learned coefficient parameters correspond to a weight coefficient and a bias value of a kernel.

* * * * *